(12) United States Patent
Yang et al.

(10) Patent No.: US 9,908,278 B2
(45) Date of Patent: *Mar. 6, 2018

(54) BLOW MOLDING DEVICE FOR A ROTARY BOTTLE BLOWING MACHINE AND A METHOD FOR USING THE SAME

(71) Applicant: CHUMPOWER MACHINERY CORP., Taichung County (TW)

(72) Inventors: Wen-Yung Yang, Taichung County (TW); Po-Cheng Lai, Taichung County (TW); Xuan-Quyen Nguyen, Taichung County (TW); Zhi-Zhong Luo, Taichung County (TW); Jin-Ge Zhang, Taichung County (TW); Huai-Rong Pan, Taichung County (TW); Shu-Lin Xie, Taichung County (TW)

(73) Assignee: CHUMPOWER MACHINERY CORP., Taichung County (TW)

( * ) Notice: Subject to any disclaimer, the term of this patent is extended or adjusted under 35 U.S.C. 154(b) by 714 days.

This patent is subject to a terminal disclaimer.

(21) Appl. No.: 14/325,246

(22) Filed: Jul. 7, 2014

(65) Prior Publication Data

US 2016/0001487 A1    Jan. 7, 2016

(51) Int. Cl.
| | |
|---|---|
| *B29C 49/36* | (2006.01) |
| *B29C 49/42* | (2006.01) |
| *B29C 49/56* | (2006.01) |
| B29L 31/00 | (2006.01) |
| B29C 49/48 | (2006.01) |

(52) U.S. Cl.
CPC .......... *B29C 49/4236* (2013.01); *B29C 49/56* (2013.01); *B29C 49/36* (2013.01); *B29C 2049/4892* (2013.01); *B29C 2049/566* (2013.01); *B29L 2031/712* (2013.01)

(58) Field of Classification Search
None
See application file for complete search history.

(56) References Cited

U.S. PATENT DOCUMENTS

| | | |
|---|---|---|
| 8,100,688 B2 | 1/2012 | Litzenberg et al. |
| 2012/0177771 A1 | 7/2012 | Graffin |

FOREIGN PATENT DOCUMENTS

| | | |
|---|---|---|
| DE | 102008045569 A1 | 3/2010 |

*Primary Examiner* — Monica Huson
(74) *Attorney, Agent, or Firm* — Bruce Stone LLP; Joseph A. Bruce

(57) ABSTRACT

A blow molding device for a rotary bottle blowing machine includes: a support base including a power-input shaft and a mold-insert control shaft which are pivotally disposed on the support base and extend along an axial direction; a drive source for driving the power-input shaft and the mold-insert control shaft to rotate; and a mold assembly with a first and second movable mold inserts pivotally disposed on the support base. The mold assembly makes the first and second movable mold inserts pivot toward or away from each other, rotation of the power-input shaft makes a bottom mold unit move in the axial direction, and can lock the first and second movable mold inserts. A method for using the blow molding device includes steps of mold opening or closing, mold lifting, and mold locking, and these steps are performed by using a single drive source.

10 Claims, 17 Drawing Sheets

BLOW MOLDING DEVICE FOR A ROTARY BOTTLE BLOWING MACHINE AND A METHOD FOR USING THE SAME

BACKGROUND OF THE INVENTION

Field of the Invention

The present invention relates to a blow molding device, and more particularly to a blow molding device for a rotary bottle blowing machine and a method for using the same.

Description of the Prior Art

FIGS. 1 and 2 show a device for blow molding containers, which is disclosed in U.S. Pat. No. 8,100,688, wherein the blow molding station 10 essentially comprises a drive shaft 12 rotatably disposed on a support structure 11. On the support structure 11 are further fixed a stationary mold portion 13 and a movable mold portion 14 capable of pivoting with respect to the stationary mold portion 13. At the bottom of the stationary mold portion 13 is formed a cam track 131. The drive shaft 12 is connected to the movable mold portion 14 by a first connecting member 15 which is perpendicular to the drive shaft 12, and is connected to a base mold portion 17 via a second connecting member 16 which is located in a direction different to the extending direction of the drive shaft 12. At the base mold portion 17 is provided a cam 171 which is movably disposed in the cam track 131. When the drive shaft 12 rotates, the first and second connecting members 15, 16 will push the movable mold portion 14 to pivot with respect to the stationary mold portion 13, meanwhile, pushing the base mold portion 17 to move up and down by moving the cam 171 along the cam track 131. The drive shaft 12 of the blowing station 10 generally uses the first and second connecting members 15, 16 which extend in different directions, to open or close the movable mold portion 14, and to move the base mold portion 17 up and down, respectively. Therefore, the first and second connecting members 15, 16 of the drive shaft 12 become the weak point of the whole blow molding station. Furthermore, both ends of the first and second connecting members 15, 16 are pivotally connected to the drive shaft 12, the movable mold portion 14 and the base mold portion 17. The pivotal connecting points will affect the smoothness, accurateness and efficiency of the operation of the blow molding station. The requirements on the structural accuracy and quality are very strict and difficult to control, therefore, the device for blow molding containers as disclosed in U.S. Pat. No. 8,100,688 is difficult to assemble, high cost, and the structural accuracy is difficult to control.

FIGS. 3 and 4 show another device for blow molding containers, which is disclosed in U.S. Pat. Application No. 20120177771A1, wherein the blow molding station 20 is provided with a fixed platform 21, a stationary mold portion 22 fixed at one side of the fixed platform 21, and columns 211 disposed at another side of the fixed platform 21 and connected a base mold portion 23. The platform 21 is further provided with a first drive shaft 24 and a second drive shaft 25. The first drive shaft 24 is connected to a movable mold portion 26 via a first crank 241. The movable mold portion 26 includes a vertical abutment 261, the first crank 241 is connected to a second crank 251 fixed to the second drive shaft 25 by a connecting member 27 which is arranged perpendicular to the extending direction of the first and second drive shafts 24, 25, and both ends of the connecting member 27 are connected in a pivotal manner. The second drive shaft 25 is provided with a strut 252 formed in the shape of the abutment 261. To move the movable mold portion 26 and the base mold portion 23, it has to use a drive source to move the base mold portion 23 up and down, and another drive source to rotate the first drive shaft 24, therefore, the structure of the device of U.S. Pat. Application No. 20120177771A1 is too complicated and high cost. During operation, the first drive shaft 24 rotates the first crank 241 and the movable mold portion 26, so as to control opening and closing of the mold. Meanwhile, the connecting member 27 connected to the first crank 241 moves the second crank 251, the second crank 251 then rotates the second drive shaft 25 and the strut 252. When the movable mold portion 26 performs mold-closing motion, the strut 252 also moves and will stop against the abutment 261 of the movable mold portion 26, so that the movable mold portion 26 can stably take up the blow-molding force during blow molding process, ensuring molding accuracy.

However, in addition to the disadvantages of complicated structure, high cost, and requiring two drive sources to open and close the mold and lift the base mold portion, the device of U.S. Pat. Application No. 20120177771A1 also has to use the connecting member 27 which is perpendicular to the extending direction of the first and second drive shafts 24, 25 to move the strut 252. The connecting member 27 becomes the weak point of the whole structure, and both ends of the connecting member 27 are also connected in a pivot manner, as a result, the requirements on the structural accuracy and quality of device of U.S. Pat. Application No. 20120177771A1 are very strict and difficult to control.

FIGS. 5 and 6 show another device for blow molding containers, which is disclosed in German Patent application No. DE102008045569A1, wherein the blow molding device 30 employs a drive source 31 to rotate a control member 32 which includes a first cam 321 and a second cam 322. The control member 32 is connected to a clamping drive member 34 by a connecting member 33. The clamping drive member 34 is provided at one side thereof with a first pivot 341 and a second pivot 342 which are abutted against the first and second cams 321, 322, respectively. Another side of the clamping drive member 34 is pivoted to a first and a second driven rods 343, 344 which are connected to two mold portions 35, 36, respectively. The drive source 31 rotates the control member 32, when the control member 32 rotates, the first and second cams 321, 322 rotate synchronously, to change the positions of the first and second pivots 341, 342 with respect to the first and second cams 321, 322, consequently making the clamping drive member 34. Then, the movement of the clamping drive member 34 can further change the positions of the first and second pivots 341, 342, thus making the first and second pivots 341, 342 move the two mold portions 35, 36 to carry out mold opening and closing.

However, the device disclosed in German Patent application No. DE102008045569A1 still can't use a single drive source to perform mold lifting and mold closing. In addition to the fact that the control member of the blow molding device 30 has to use the drive source to move the clamping drive member, the clamping drive member also has to be provided with the first and second pivots 341, 342 in order to perform mold closing. Since the mold portions 35, 36 are driven by the clamping drive member 34 in an indirect manner to perform mold closing and opening operation, which will reduce the work efficiency and operation accuracy.

The present invention has arisen to mitigate and/or obviate the afore-described disadvantages.

SUMMARY OF THE INVENTION

The primary objective of the present invention is to provide a blow molding device for a rotary bottle blowing machine without the disadvantages of complicated structure, low efficiency and accuracy of the conventional blow molding machine.

To achieve the above objective, a blow molding device for a rotary bottle blowing machine in accordance with the present invention comprises:

a support base including a power-input shaft and a mold-insert control shaft which are pivotally disposed on the support base and extend along an axial direction;

a drive source for driving the power-input shaft and the mold-insert control shaft to rotate; and a mold assembly including a first movable mold insert and a second mold insert which are pivotally disposed on the support base, the mold assembly being controlled by the mold-insert control shaft to make the first and second movable mold inserts pivot toward or away from each other, rotation of the power-input shaft being used to drive a bottom mold unit to move in the axial direction, and drive a mold locking unit to lock the first and second movable mold inserts.

To achieve the above objective, a method for using the blow molding device for a rotary bottle blowing machine comprises the following steps: step of mold opening or closing, step of mold lifting, and a step of mold locking, and these steps are performed by using a single drive source.

The step of mold opening or closing includes making the first and second movable mold inserts of the mold assembly pivot toward or away from each other.

The step of mold lifting includes up and down movement of the bottom mold unit.

The step of mold locking is to lock the first and second movable mold inserts by using the mold locking unit.

The present invention just needs one drive source M to move the respective components to carry out the step of mold opening or closing, the step of mold lifting, and the step of mold locking. The operation of mold opening and locking can be quickly carried out with only one-time input of drive power. Hence, the structure and cost of the drive source are simplified and reduced. The drive source in this embodiment is a servomotor. Since the mold-insert driving unit, the lifting unit and the mold-moving unit drive the open/close drive element, the bottom-mold driving member, and the mold-locking drive member to move by different grooves of different shapes and arranged in different directions. The driving movement through grooves is precise and stable, and the driving efficiency is also improved.

DETAILED DESCRIPTION OF THE PREFERRED EMBODIMENTS

Figure 1:
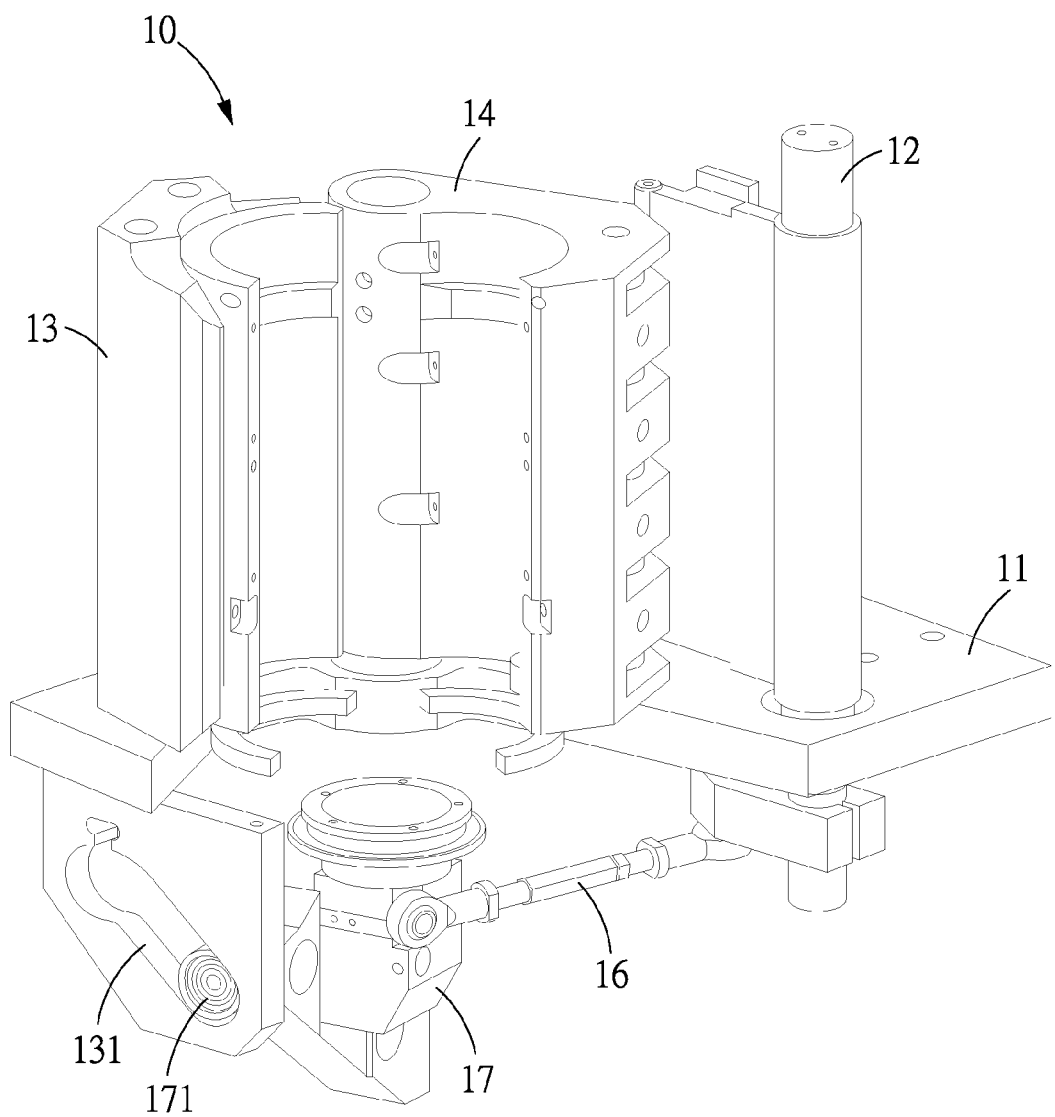
FIG. 1 shows a mold open state of a first conventional blow molding device.
Figure 2:
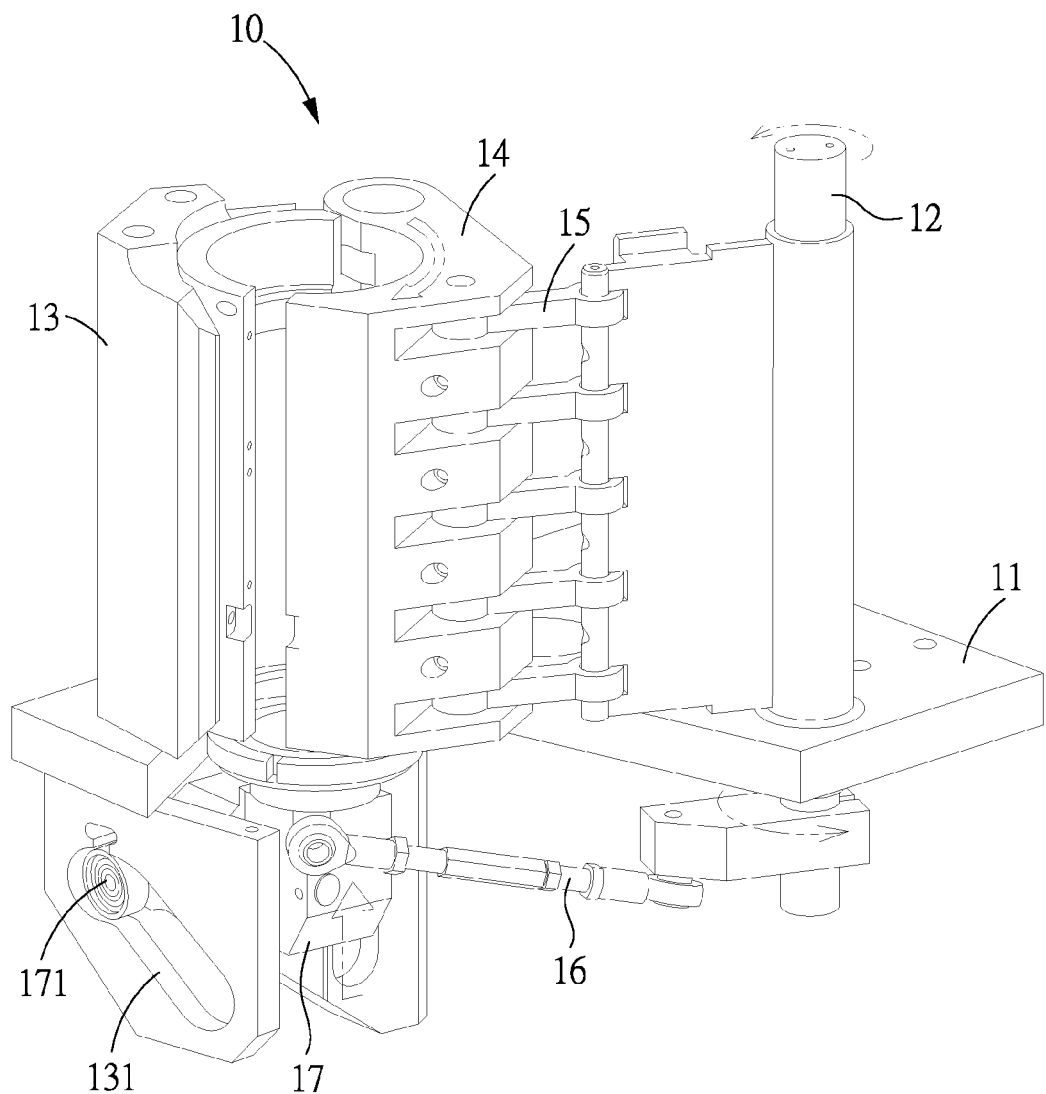
FIG. 2 shows a mold closed state of the first conventional blow molding device.
Figure 3:
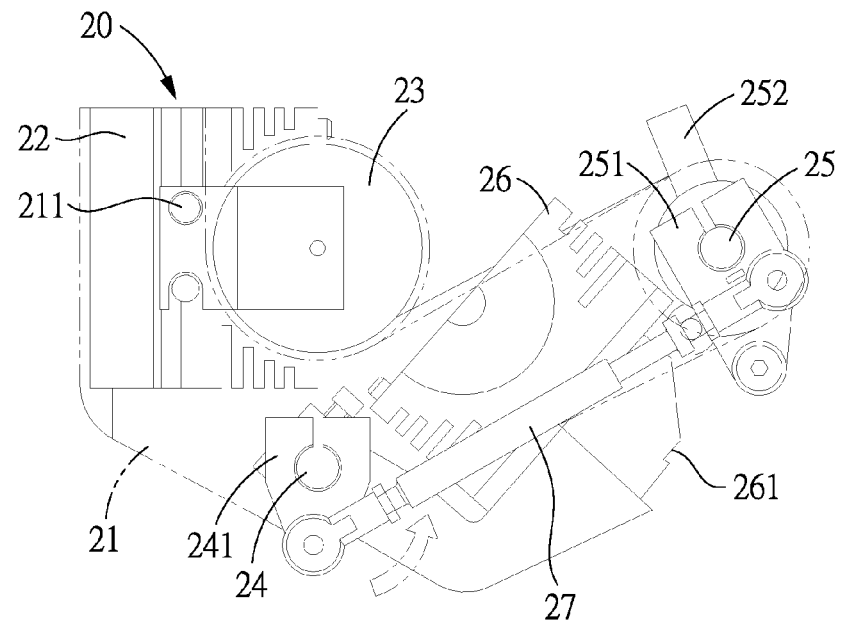
FIG. 3 shows a mold open state of a second conventional blow molding device.
Figure 4:
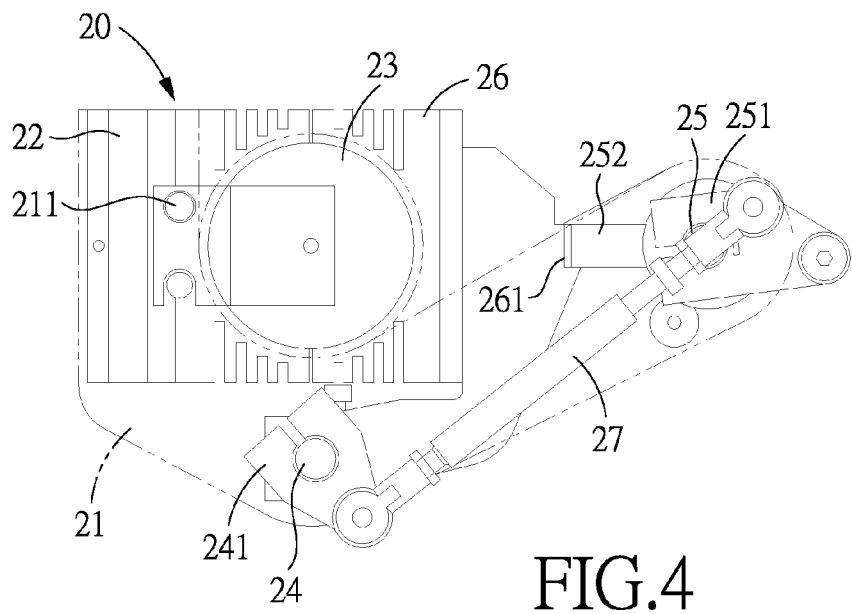
FIG. 4 shows a mold closed state of the second conventional blow molding device.
Figure 5:
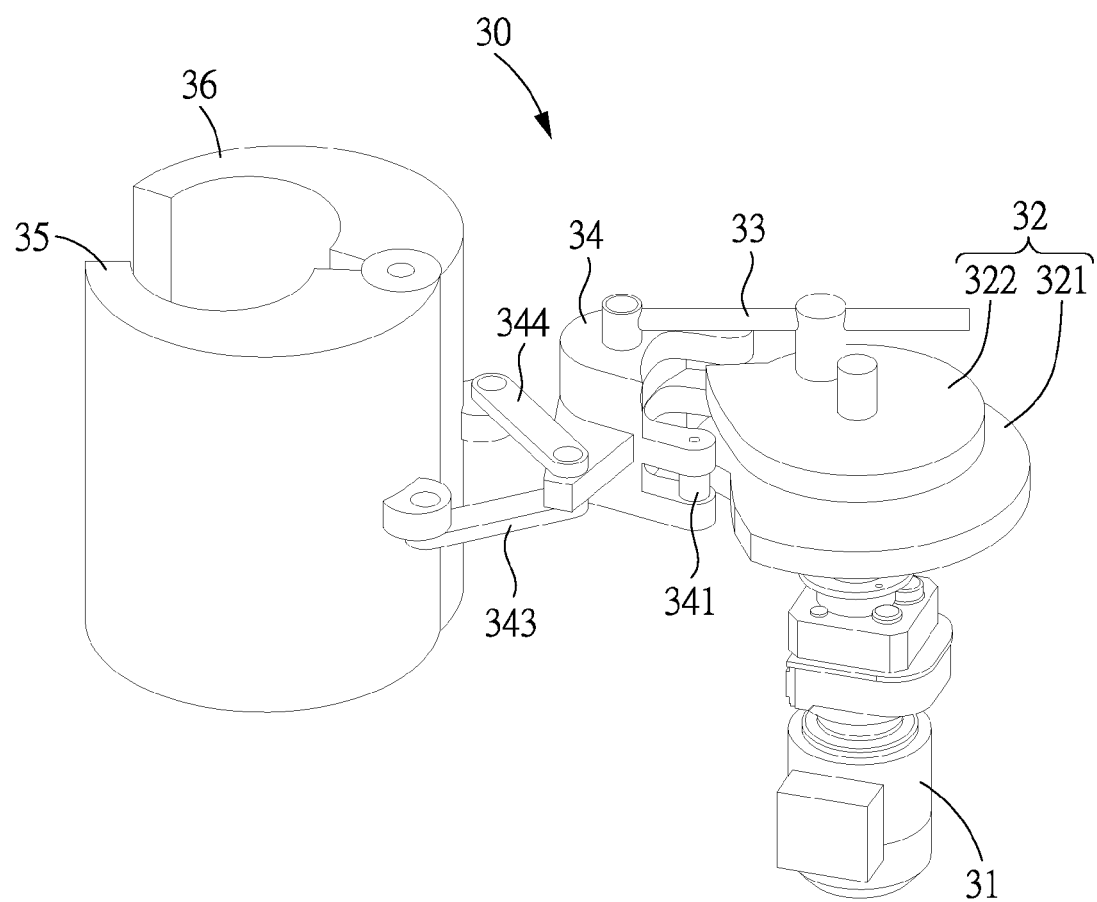
FIG. 5 shows a mold open state of a third conventional blow molding device.
Figure 6:
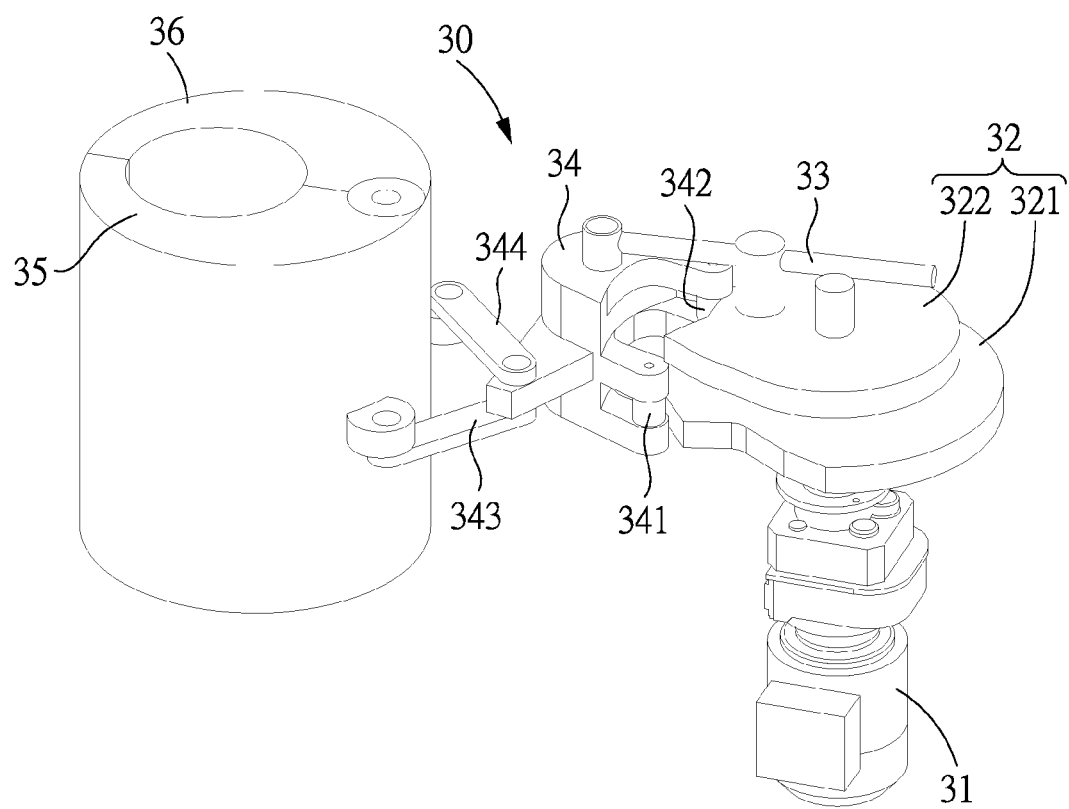
FIG. 6 shows a mold closed state of the third conventional blow molding device.
Figure 7:
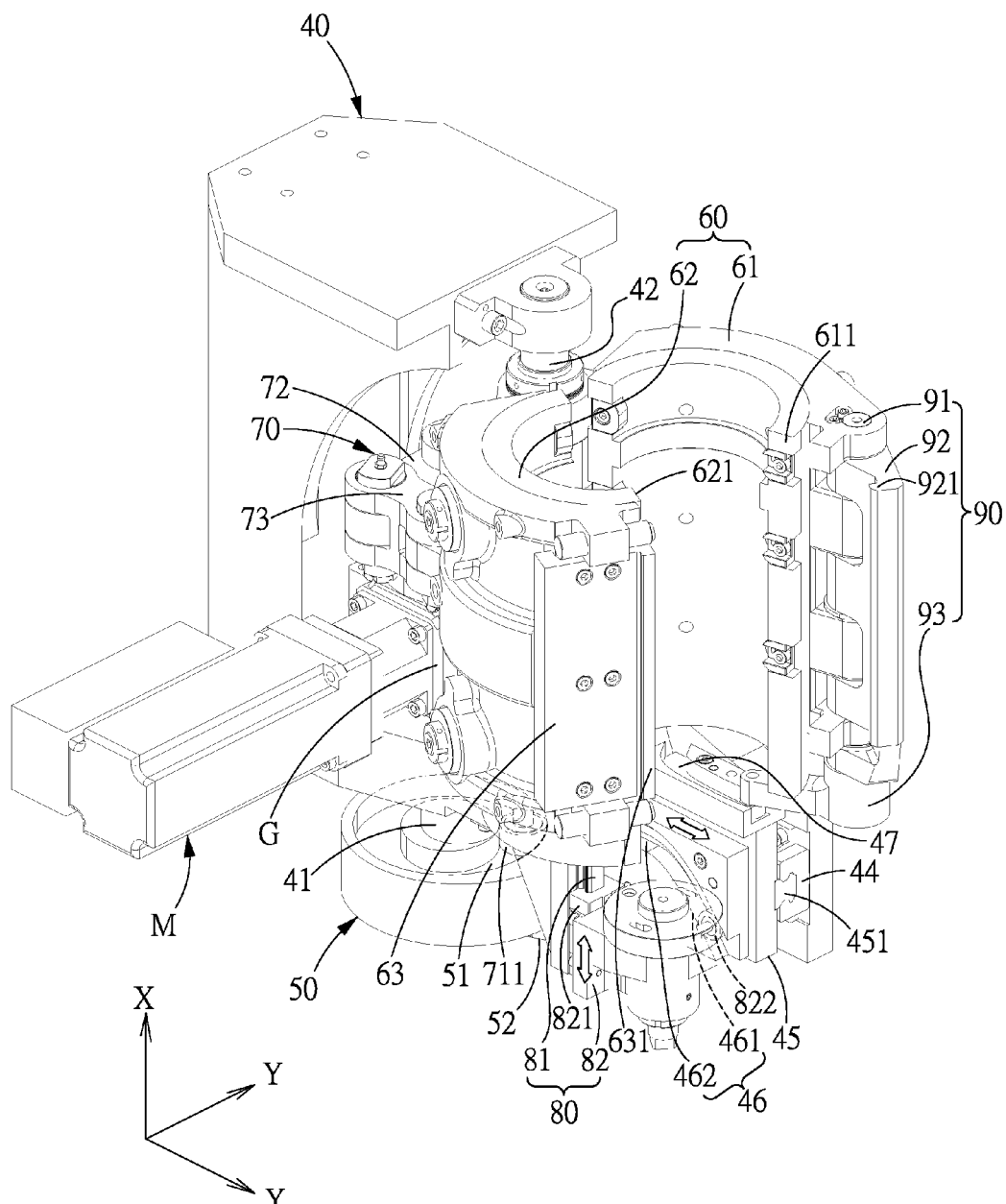
FIG. 7 is a perspective view of a mold open state of a blow molding device for a rotary bottle blowing machine in accordance with a preferred embodiment of the present invention.
Figure 8:
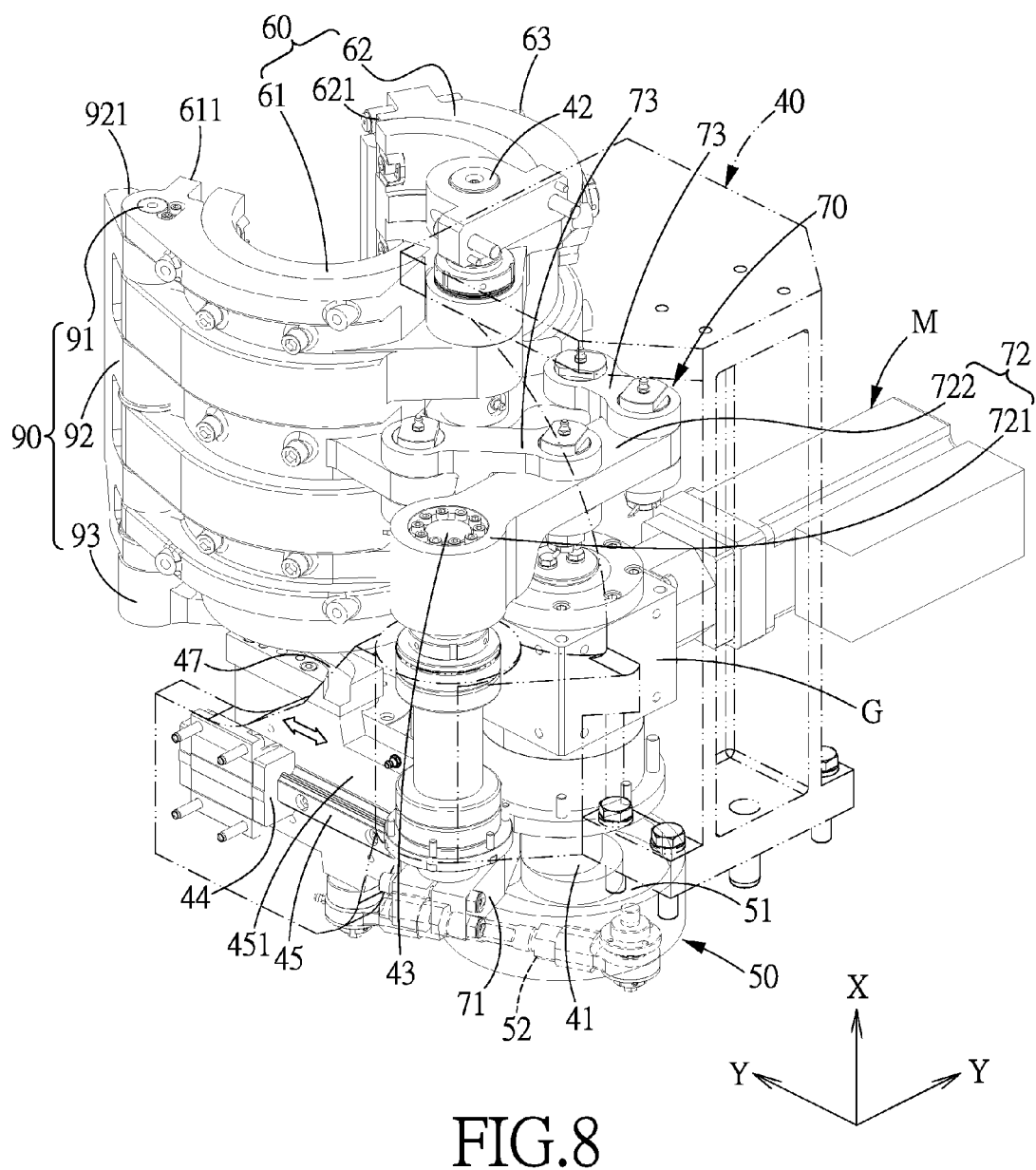
FIG. 8 is another perspective view showing the mold open state of the blow molding device for a rotary bottle blowing machine in accordance with the present invention.
Figure 9:
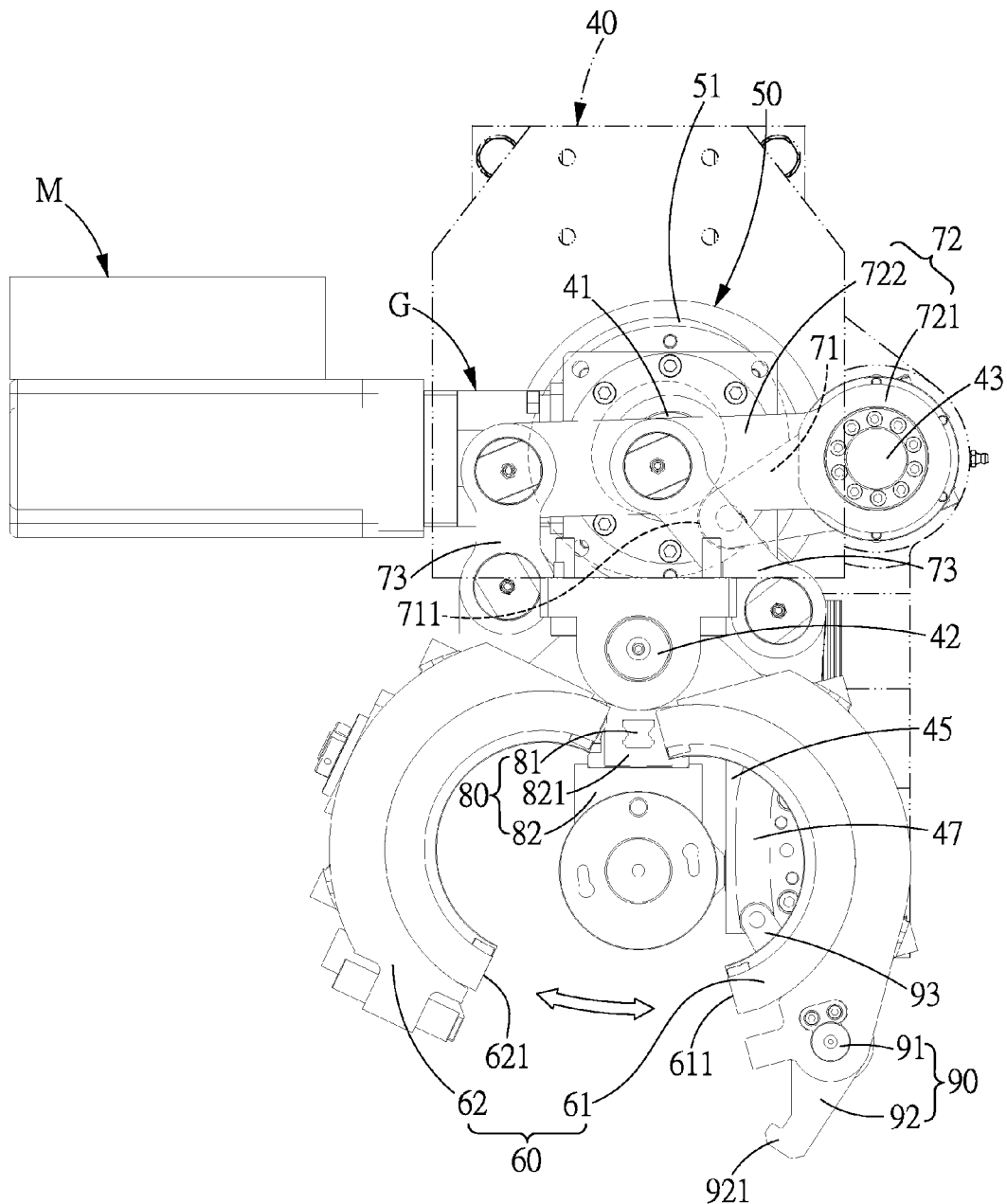
FIG. 9 is a top view showing the mold open state of the blow molding device for a rotary bottle blowing machine in accordance with the present invention.
Figure 10:
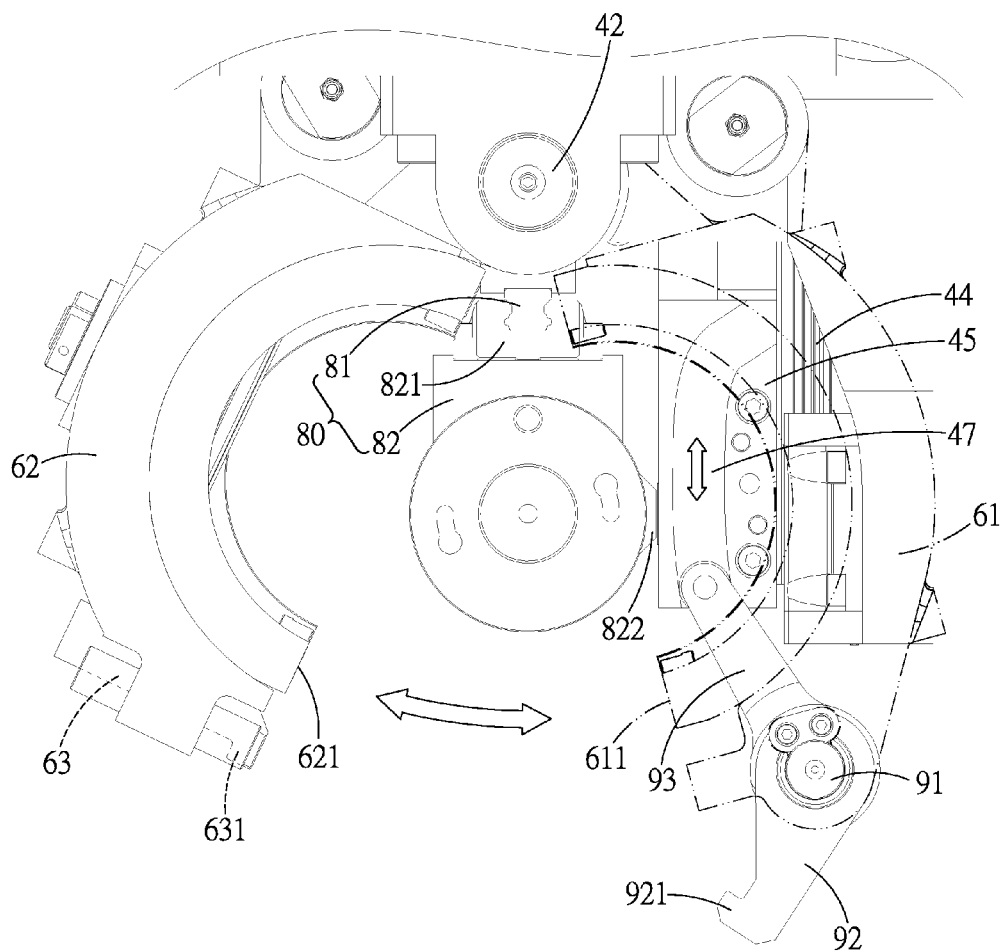
FIG. 10 is another top view showing the mold open state of the blow molding device for a rotary bottle blowing machine in accordance with the present invention.
Figure 11:
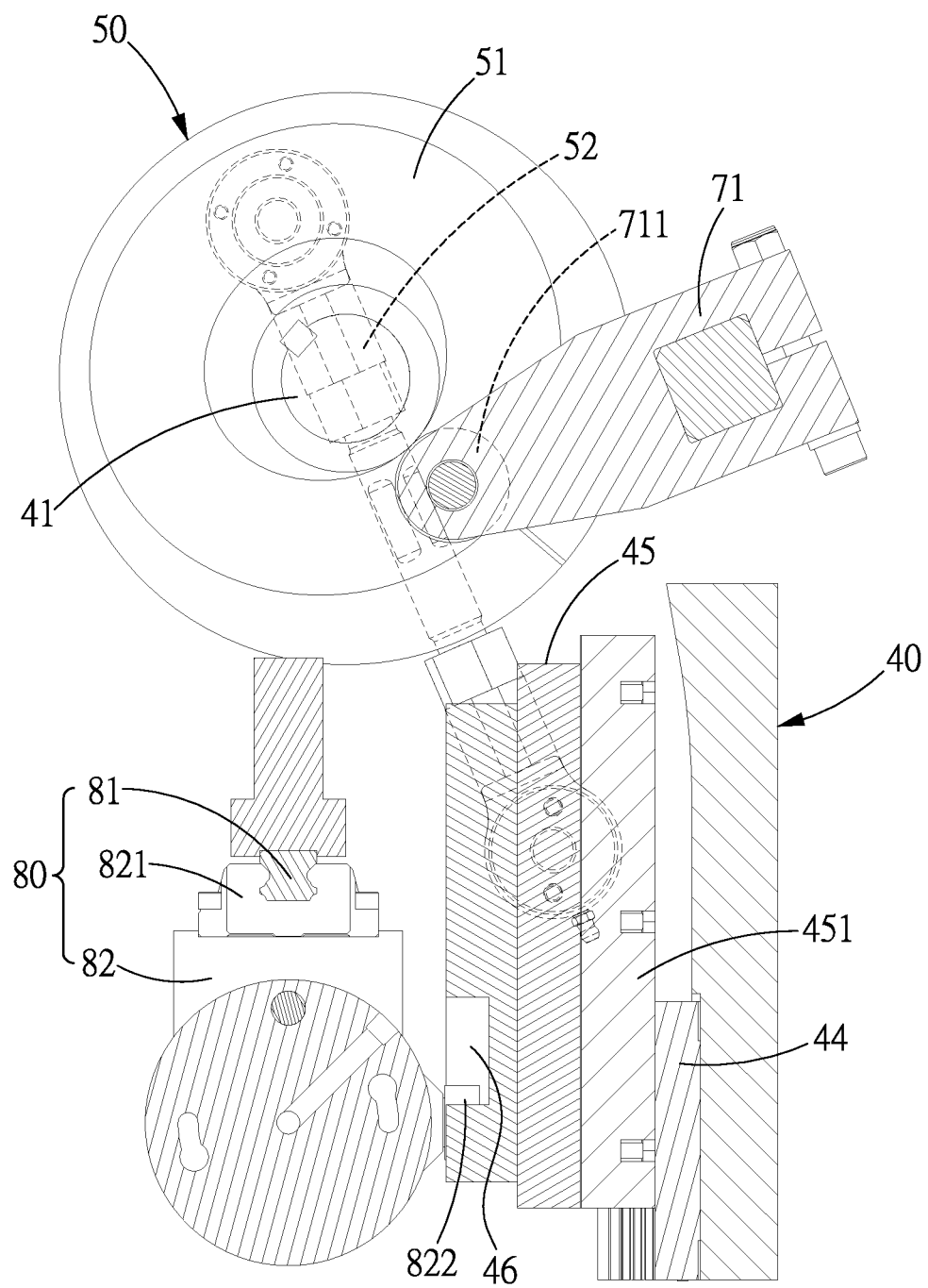
FIG. 11 is a cross sectional view showing the mold open state of the blow molding device for a rotary bottle blowing machine in accordance with the present invention.
Figure 12:
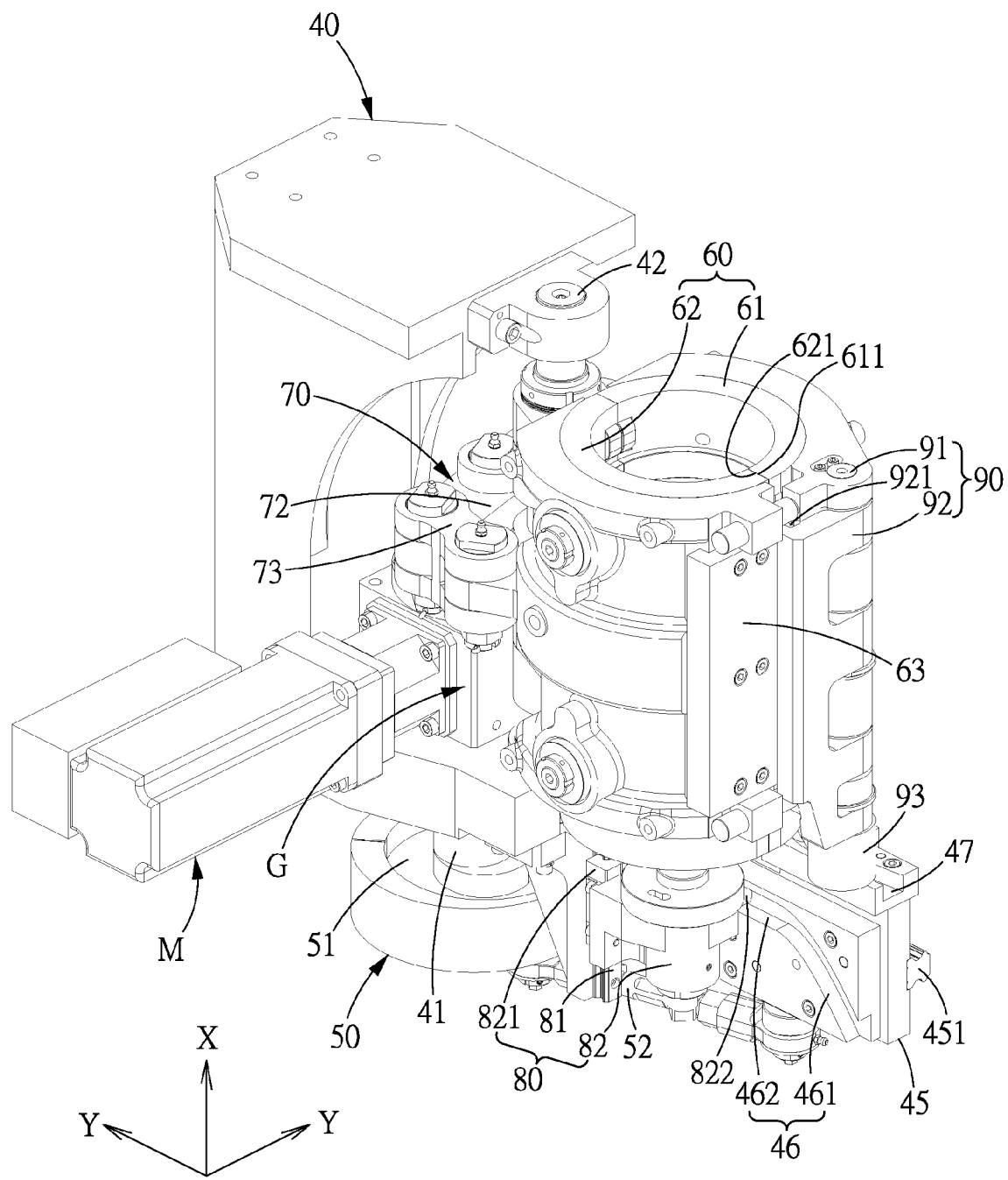
FIG. 12 is a perspective view showing the mold closed state of the blow molding device for a rotary bottle blowing machine in accordance with the present invention.
Figure 13:
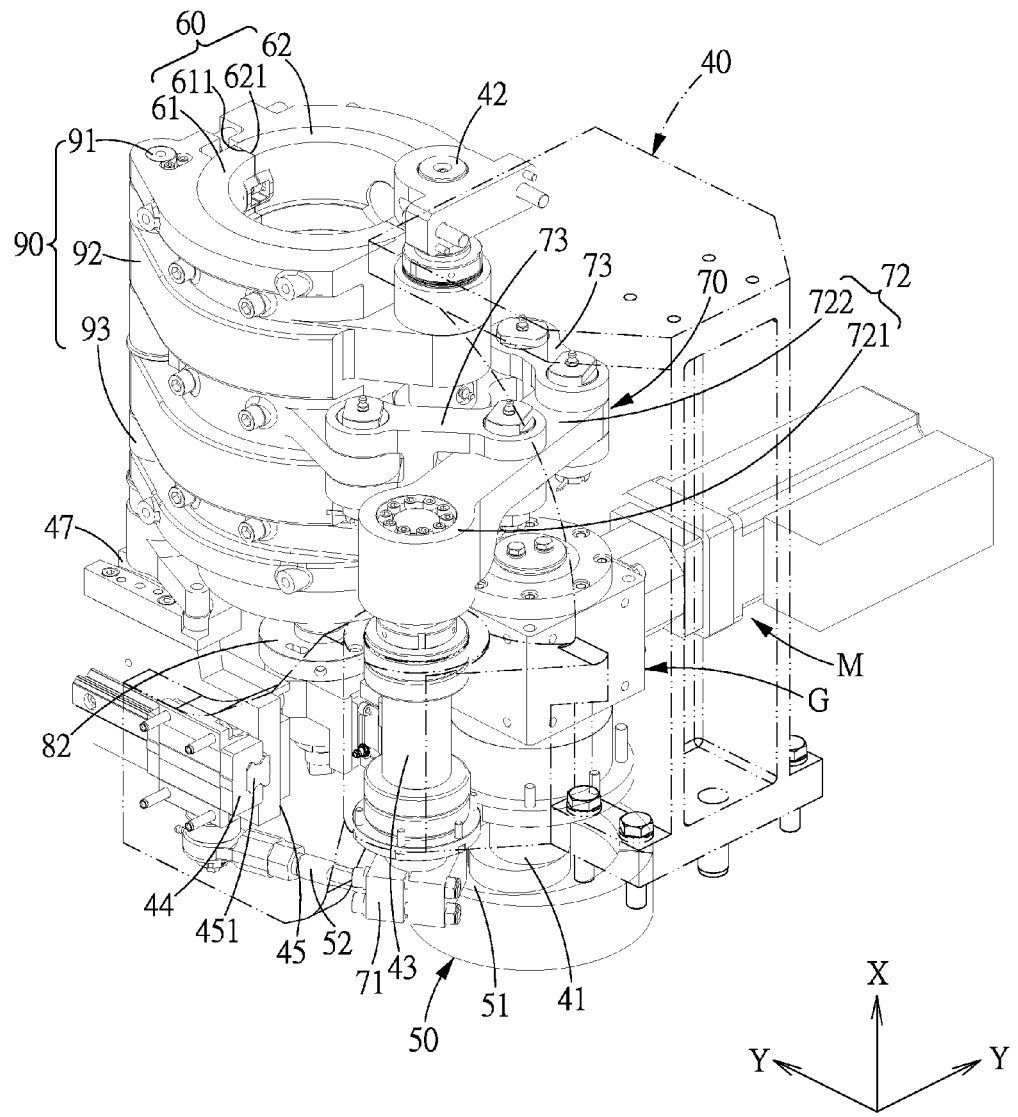
FIG. 13 is another perspective view showing the mold closed state of the blow molding device for a rotary bottle blowing machine in accordance with the present invention.
Figure 14:
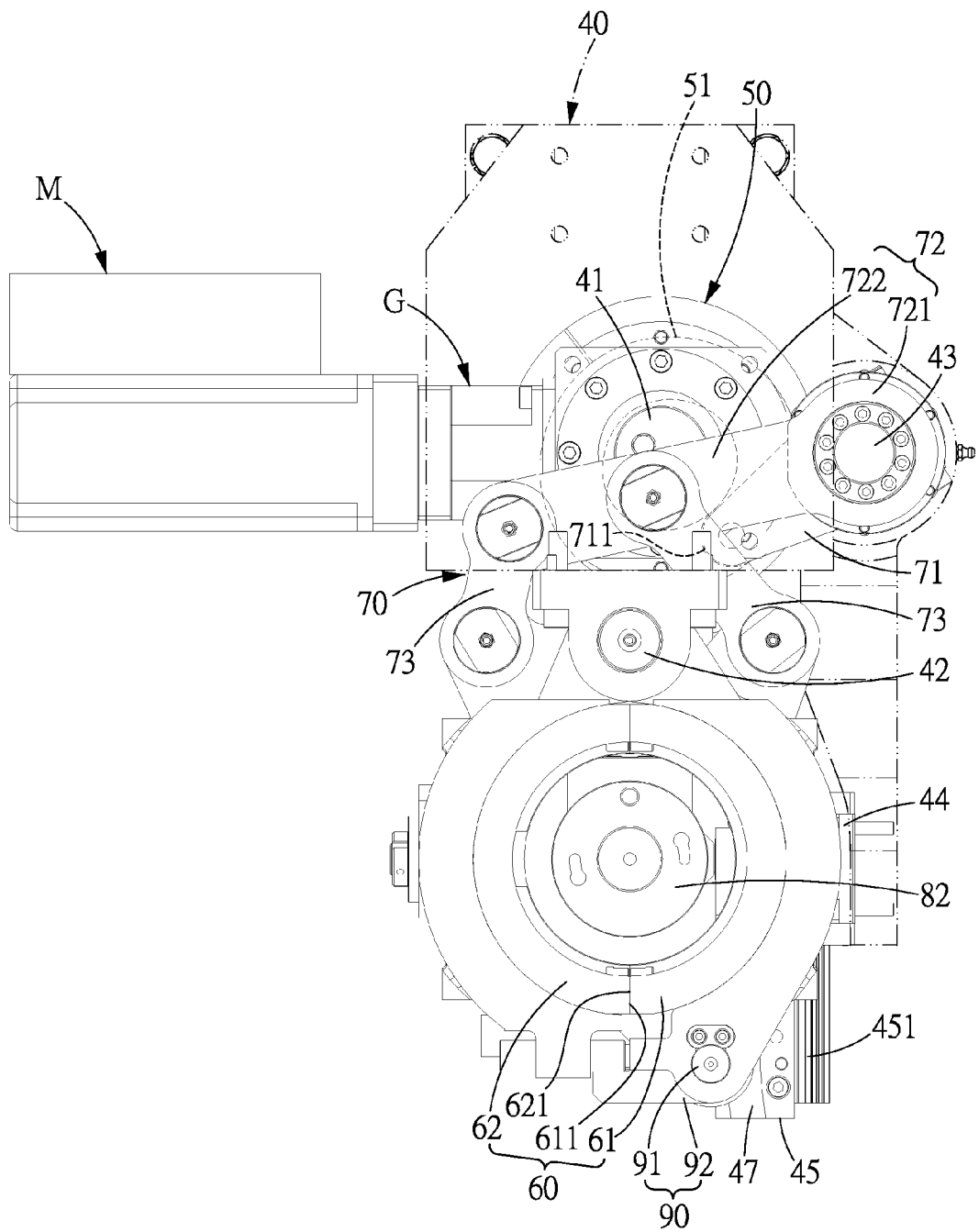
FIG. 14 is a top view showing the mold closed state of the blow molding device for a rotary bottle blowing machine in accordance with the present invention.
Figure 15:
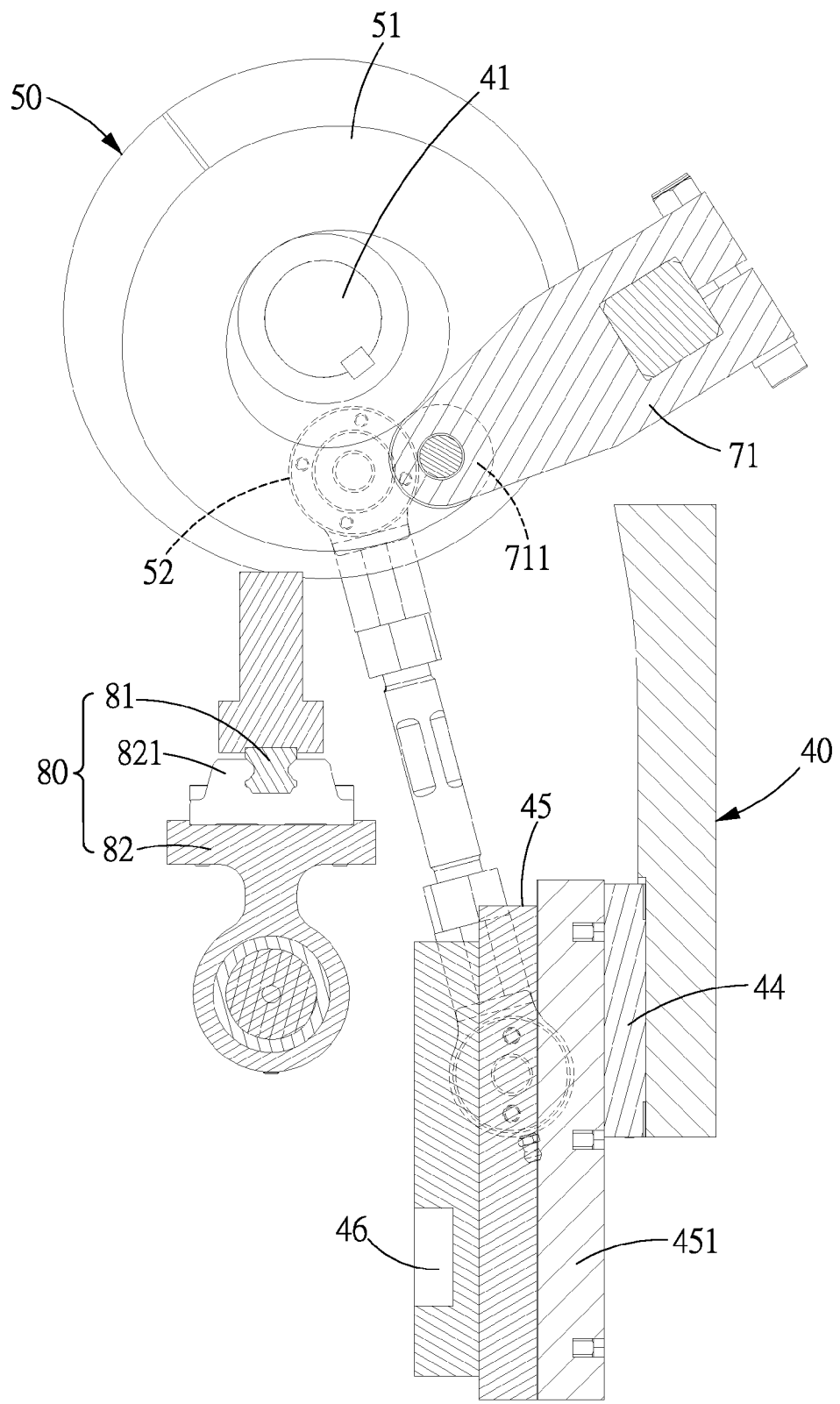
FIG. 15 is cross sectional view showing the mold closed state of the blow molding device for a rotary bottle blowing machine in accordance with the present invention.

The present invention will be clearer from the following description when viewed together with the accompanying drawings, which show, for purpose of illustrations only, the preferred embodiment in accordance with the present invention.

Referring to FIGS. 7-17, a blow molding device for a rotary bottle blowing machine in accordance with a preferred embodiment of the present invention comprises: a support base 40, a drive member 50, a mold assembly 60, an open/close control unit 70, a bottom mold unit 80, and a mold locking unit 90.

The support base 40 includes a power-input shaft 41, a mold-insert pivot 42 and a mold-insert control shaft 43 which extend along an axial direction X, and a direction perpendicular to the axial direction X is defined as a radial direction Y. The power-input shaft 41 is connected to and rotated by a drive source M. In this embodiment, the drive source M drives the power-input shaft 41 to rotate via a gearbox and the drive source M is a servomotor.

On the support base 40 is disposed a linear-movement guide member 44 extending along the direction Y. In this embodiment, the linear-movement guide member 44 is a linear slide block extending in the radial direction Y. On the linear-movement guide member 44 is provided a guide unit 45 which is slidably inserted, together with an assistant movement member 451, into the linear-movement guide member 44, so that the guide unit 45 can be provided on the support base 40 and movable along the radial direction Y.

The guide unit 45 is further provided with a lifting unit 46 and a mold-moving unit 47. In this embodiment, the lifting unit 46 includes a first lifting groove 461 and a second lifting groove 462. The first lifting groove 461 is a slanting groove with a height difference in the axial direction X. The second lifting groove 462 is in communication with and located at the same height as the first lifting groove 461 in the axial direction X and extends in the radial direction Y. The mold-moving unit 47 is a guide groove horizontally extending in the axial direction X.

The drive member 50 has its center fixed to the power-input shaft 41, and at one side of the drive member 50 is provided a mold-insert driving unit 51 which is a cam-shaped cavity in this embodiment. Between the drive member 50 and the mold-insert driving unit 51 is connected a traction member 52 which has one end eccentrically pivoted to another side of the drive member 50, and another end pivoted to the guide unit 45, so that the rotation power of the power-input shaft 41 is transmitted to the guide unit 45 via the drive member 50, and then the guide unit 45 drives the lifting unit 46 and the mold-moving unit 47.

The mold assembly 60 includes a first movable mold insert 61 and a second mold insert 62. The first movable mold insert 61 has one side pivoted to the mold-insert pivot 42, and another side of the first movable mold insert 61 is a first side 611. The second movable mold insert 62 has one side pivoted to the mold-insert pivot 42 and is pivotable with respect to the first movable mold insert 61, and another side of the second movable mold insert 62 is a second side 621. By such arrangements, the first and second movable mold inserts 61, 62 are pivotally disposed on the support base 40, and the pivoting motion of the second movable mold insert 62 makes the second side 621 move toward or away from the first side 611 of the first movable mold insert 61. The second movable mold insert 62 is provided with an engaging member 63 which is located adjacent to the second side 621, and the engaging member 63 includes an engaging portion 631 which is an L-shaped structure in this embodiment.

The open/close control unit 70 includes an open/close drive element 71, a swing arm 72 and two extension arms 73. The open/close drive element 71 has one end fixed to one end of the mold-insert control shaft 43, and another end of the open/close drive element 71 extends in the radial direction Y and is connected to a drive wheel 711 which is received in the mold-insert drive unit 51 of the drive member 50. By such arrangements, the mold-insert control shaft 43 is rotated by the drive source M via the open/close drive element 71, the drive member 50 and the power-input shaft 41. The swing arm 72 includes a connecting end 721 and an arm portion 722 extending in the radial direction Y from the connecting end 721, and the connecting end 721 is fixed to another end of the mold-insert control shaft 43. The two extension arms 73 each have one end pivoted to the first and second movable mold inserts 61, 62, respectively, and another ends of the two extension arms 73 are pivoted to the arm portion 722 of the swing arm 72 and located at different radial positions in the radial direction Y, so that the mold-insert control shaft 43 is driven by the mold-insert drive unit 51 to rotate the open/close control unit 70, then the open/close control unit 70 makes the first and second movable mold inserts 61, 62 pivot toward or away from each other to open or close the mold.

The bottom mold unit 80 is disposed on the support base 40 and includes a guide member 81 and a bottom mold 82. The guide member 81 extends in the axial direction X and is fixed to the support base 40. In this embodiment, the guide member 81 is a rail. The bottom mold 82 is slidably sleeved onto the guide member 81 via a sleeve 821, and capable of moving in the axial direction X. A bottom-mold driving member 822 has one end fixed to the bottom mold 82 and another end received in the lifting unit 46, so that the bottom mold unit 80 can be driven to move along the axial direction X by the lifting unit 46. Namely, the rotation power of the power-input shaft 41 is transmitted to the bottom mold unit 80 via the drive member 50, the guide unit 45 and the lifting unit 46, so as to drive the bottom mold unit 80 to move along the axial direction X.

The mold locking unit 90 includes a mold locking shaft 91 and a mold locking block 92. The mold locking block 92 has one side connected to the mold locking shaft 91 and another side formed with a hook portion 921. The mold locking shaft 91 is pivotally disposed at the first side 611 of the first movable mold insert 61, the mold locking block 92 is pivotally connected to one end of a mold-locking drive member 93, and another end of the mold-locking drive member 93 is disposed in the mold-moving unit 47, so that the rotation power of the power-input shaft 41 is transmitted from the drive member 50, the guide unit 45 and the mold-moving unit 47 to the mold locking unit 90, making the mold locking unit 90 lock the first and second movable mold inserts 61, 62.

Figure 18:
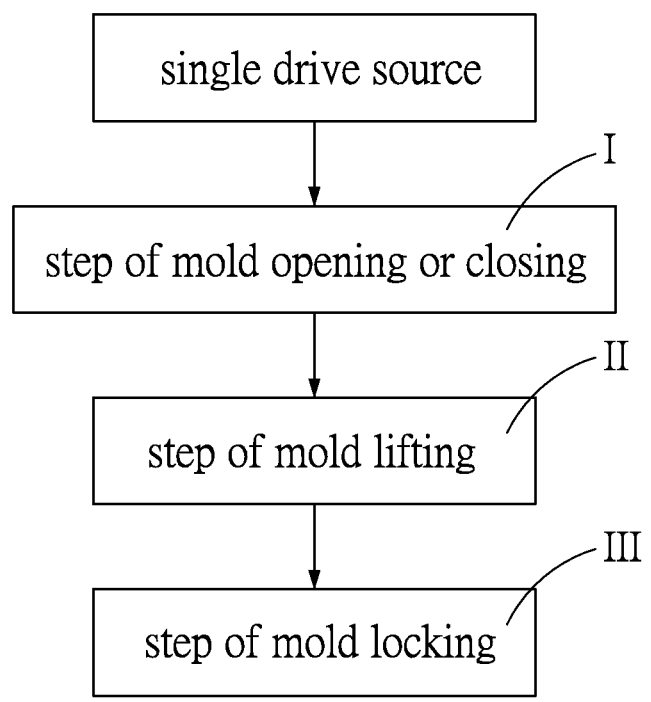
FIG. 18 is a flow chart showing a method for using the blow molding device for a rotary bottle blowing machine in accordance with the present invention.

Referring then to FIG. 18, a method for using the blow molding device for a rotary bottle blowing machine in accordance with the present invention, comprises the following steps: step I of mold opening or closing, step II of mold lifting, and a step III of mold locking, and these steps are performed by using a single drive source M.

The step I of mold opening or closing includes making the first and second movable mold inserts 61, 62 of the mold assembly 60 pivot toward or away from each other. As shown in FIGS. 7-11, firstly, the drive source M is turned on to rotate the power-input shaft 41 via the gearbox G, then the power-input shaft 41 rotates the drive member 50, so that the position of the mold-insert driving unit 51 changes, and the position of the drive wheel 711 of the open/close drive element 71 inside the mold-insert driving unit 51 also changes with respect to the mold-insert driving unit 51. When one end of the open/close drive element 71 moves the drive wheel 711, another end of the open/close drive element 71 fixed the mold-insert control shaft 43 will rotate.

When the mold-insert control shaft 43 rotates, the connecting end 721 of the swing arm 72 fixed to the mold-insert control shaft 43 will also rotate, which will cause pivoting motion of the arm portion 722. Meanwhile, the two extension arms 73 disposed between the arm portion 722 and the first and second movable mold inserts 61, 62 will drive the first and second movable mold inserts 61, 62 to pivot, so as to carry out the step I of mold closing or opening, as shown in FIGS. 12-15. When the first and second movable mold inserts 61, 62 are driven by the open/close control unit 70 to carry out the step I of mold closing or opening, the traction member 52 eccentrically pivoted to the drive member 50 will push the guide unit 45 to move. The guide unit 45 is restricted by the linear-movement guide member 44 and the assistant movement member 451 and only capable of linearly moving along the radial direction Y, due to the fact that the guide unit 45 is slidably inserted into the linear-movement guide member 44 via the assistant movement member 451.

The molding opening operation is as shown in FIGS. 7-11, wherein the bottom-mold driving member 822 of the bottom mold 82 is located at the farthest end of the first lifting groove 461 of the lifting unit 46 away from the second lifting groove 462. When the guide unit 45 moves in the radial direction Y, the bottom-mold driving member 822 of the bottom mold 82 will move from the first lifting groove 461 to the second lifting groove 462, causing position change of the bottom-mold driving member 822 in the axial direction X. Meanwhile, the bottom mold 82 is restricted by the sleeve 821 and the guide member 81 to stably move along the axial direction X in a linear manner. Hence, the bottom mold 82 can be moved up and down in the axial direction X to close the mold and carry out the step II of mold lifting, as shown in FIGS. 12-15.

Figure 16:
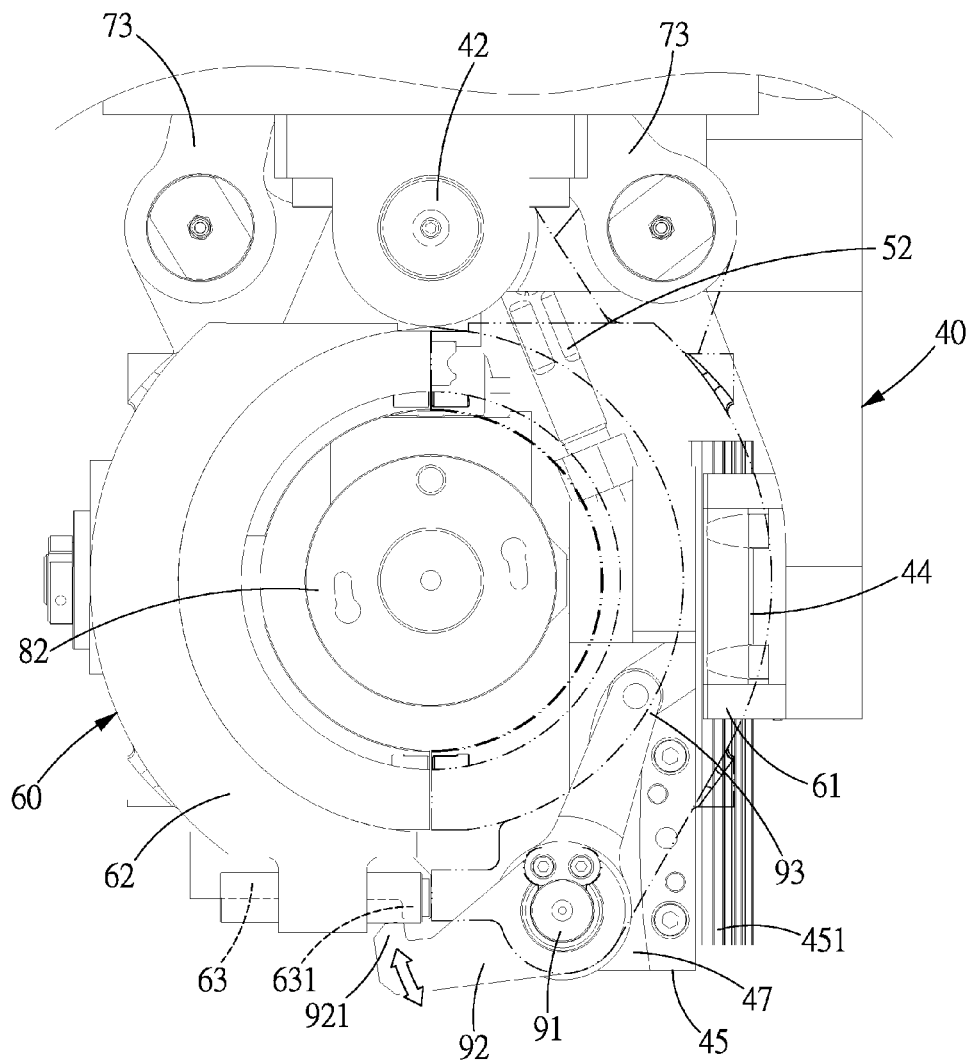
FIG. 16 is a top view showing the mold closed state of the blow molding device for a rotary bottle blowing machine in accordance with the present invention, wherein the mold is closed and being locked.
Figure 17:
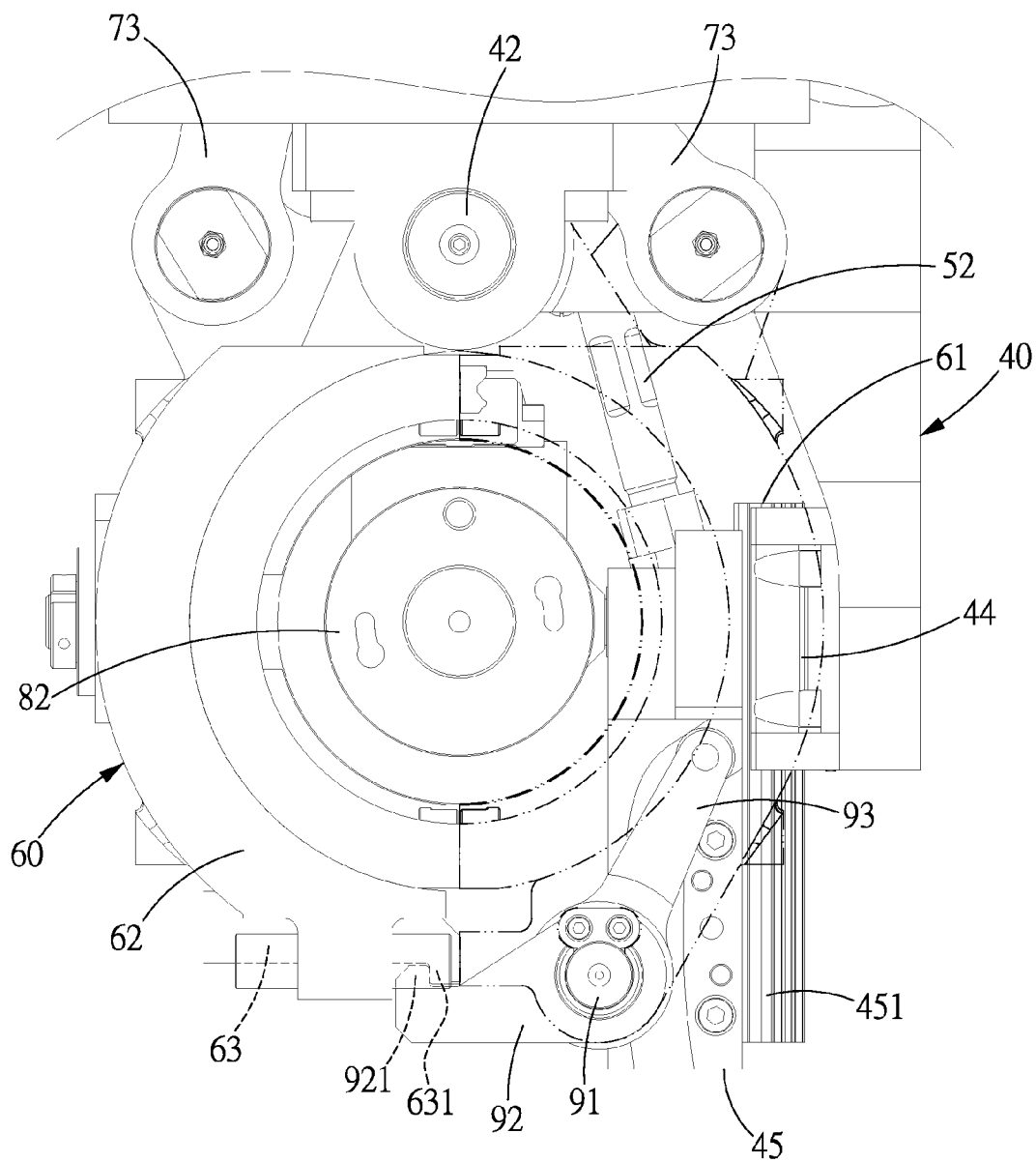
FIG. 17 is a top view showing the mold closed state of the blow molding device for a rotary bottle blowing machine in accordance with the present invention, wherein the mold is closed and locked.

When the guide unit 45 moves in the radial direction Y to push the bottom mold 82 up to carry out mold closing operation, the mold-moving unit 47 also drives the guide unit 45 to move linearly. The mold-locking drive member 93 then moves with respect to the mold-moving unit 47 and drives the mold locking block 92 to pivot toward the second movable mold insert 62 until the hook portion 921 is hooked to the engaging portion 631 of the engaging member 63, so as to carry out the operation of mold closing and locking, and finish the step III of mold locking, as shown in FIGS. 16 and 17. The step III of mold locking mainly includes the locking of the mold locking unit 90 to the first and second movable mold inserts 61, 62. Certainly, as the operation continues, the components of the mold can be moved in a reverse direction to carry out the operation of mold opening and closing, so that the operation efficiency is improved.

It is to be noted that the present invention just needs one drive source M to move the respective components to carry out the step I of mold opening or closing, the step II of mold lifting, and the step III of mold locking. The operation of mold opening and locking can be quickly carried out with only one-time input of drive power. Hence, the structure and cost of the drive source 31 are simplified and reduced. The drive source in this embodiment is a servomotor.

Since the mold-insert driving unit 51, the lifting unit 46 and the mold-moving unit 47 drive the open/close drive element 71, the bottom-mold driving member 822, and the mold-locking drive member 93 to move by different grooves of different shapes and arranged in different directions. The driving movement through grooves is precise and stable, and the driving efficiency is also improved.

The present invention is mainly used for mold blowing. After mold closing, the first and second movable mold inserts 61, 62 and the bottom mold 82 will be subjected to the blowing inflation force, and the mold locking unit 90 can firmly lock the first and second movable mold inserts 61, 62 to ensure precision and stability of molding process.

While we have shown and described various embodiments in accordance with the present invention, it is clear to those skilled in the art that further embodiments may be made without departing from the scope of the present invention.

What is claimed is:

1. A blow molding device for a rotary bottle blowing machine comprising:
    a support base including a power-input shaft and a mold-insert control shaft which are pivotally disposed on the support base and extend along an axial direction;
    a drive source for driving the power-input shaft and the mold-insert control shaft to rotate; and
    a mold assembly including a first movable mold insert and a second mold insert which are pivotally disposed on the support base, the mold assembly being controlled by the mold-insert control shaft to make the first and second movable mold inserts pivot toward or away from each other, rotation of the power-input shaft being used to drive a bottom mold unit to move in the axial direction, and drive a mold locking unit to lock the first and second movable mold inserts.

2. The blow molding device for the rotary bottle blowing machine as claimed in claim 1, wherein a direction perpendicular to the axial direction is defined as a radial direction, and on the linear-movement guide member is provided a guide unit which is able to move in the radial direction, on the guide unit is provided a lifting unit;
    a drive member has its center fixed to the power-input shaft, and at one side of the drive member is provided a mold-insert driving unit, another side of the drive member is connected to the guide unit via a traction member so as to drive the guide unit to move;
    the mold-insert control shaft is provided with an open/close control unit and driven by the mold-insert driving unit to make the open/close control unit open or close the first and second movable mold inserts;
    the bottom mold unit is disposed on the support base and driven by the lifting unit 46 to move along the axial direction.

3. The blow molding device for the rotary bottle blowing machine as claimed in claim 1, wherein the support base includes a mold-insert pivot which extends along the axial direction, the first movable mold insert has one side pivoted to the mold-insert pivot, and another side of the first movable mold insert is a first side, the second movable mold insert has one side pivoted to the mold-insert pivot and is pivotable with respect to the first movable mold insert, and another side of the second movable mold insert is a second side, pivoting motion of the second movable mold insert makes the second side move toward or away from the first side of the first movable mold insert.

4. The blow molding device for the rotary bottle blowing machine as claimed in claim 2, wherein the mold-insert driving unit is a cam-shaped cavity, the lifting unit includes a first lifting groove and a second lifting groove, the first lifting groove is a slanting groove with a height difference in the axial direction, the second lifting groove is in communication with and located at the same height as the first lifting groove in the axial direction and extends in the radial direction.

5. The blow molding device for the rotary bottle blowing machine as claimed in claim 2, wherein the open/close control unit includes an open/close drive element, a swing arm and two extension arms, the open/close drive element has one end fixed to one end of the mold-insert control shaft, and another end of the open/close drive element extends in the radial direction and is connected to a drive wheel received in the mold-insert drive unit of the drive member, the swing arm includes a connecting end and an arm portion extending in the radial direction from the connecting end, and the connecting end is fixed to another end of the mold-insert control shaft, the two extension arms each have one end pivoted to the first and second mold inserts, respectively, and another ends of the two extension arms are pivoted to the arm portion of the swing arm and located at different radial positions in the radial direction.

6. The blow molding device for the rotary bottle blowing machine as claimed in claim 2, wherein the bottom mold unit includes a guide member and a bottom mold, the guide member extends in the axial direction and is fixed to the support base, the bottom mold is slidably sleeved onto the guide member via a sleeve, and capable of moving in the axial direction, a bottom-mold driving member has one end fixed to the bottom mold and another end received in the lifting unit, the guide member is a rail.

7. The blow molding device for the rotary bottle blowing machine as claimed in claim 2, wherein a linear-movement guide member extending along the direction is disposed on the support base, the guide unit is slidably inserted, together with an assistant movement member, into the linear-movement guide member, and the linear-movement guide member is a linear slide block extending in the radial direction.

8. The blow molding device for the rotary bottle blowing machine as claimed in claim 2, wherein a traction member is connected between the drive member and the mold-insert driving unit and has one end eccentrically pivoted to another side of the drive member, and has another end pivoted to the guide unit.

9. The blow molding device for the rotary bottle blowing machine as claimed in claim 2, wherein the guide unit is further provided with a mold-moving unit which is a guide groove horizontally extending in the axial direction, the second movable mold insert is provided with an engaging member which includes an engaging portion, a mold locking unit is provided on the first movable mold insert and includes a mold locking shaft and a locking block, the mold locking block has one side connected to the mold locking shaft and another side formed with a hook portion, the mold locking shaft is pivotally disposed at the first movable mold insert, the mold locking block is pivotally connected to one end of a mold-locking drive member, and another end of the mold-locking drive member is disposed in the mold-moving unit.

10. The blow molding device for the rotary bottle blowing machine as claimed in claim 1, wherein the drive source is a servomotor.

* * * * *